United States Patent [19]
Gunmar et al.

[11] Patent Number: 5,307,510
[45] Date of Patent: Apr. 26, 1994

[54] METHOD FOR DETERMINING THE DEGREE OF COVERAGE IN A MOBILE RADIO SYSTEM

[75] Inventors: Krister Gunmar; Ulf Tegth, both of Haninge, Sweden

[73] Assignee: Televerket, Farsta, Sweden

[21] Appl. No.: 995,552

[22] Filed: Dec. 24, 1992

Related U.S. Application Data

[63] Continuation of Ser. No. 591,466, Oct. 1, 1990, abandoned.

[30] Foreign Application Priority Data

Sep. 29, 1989 [SE] Sweden ............................. 8903208

[51] Int. Cl.[5] ....................... H04B 17/02; H04Q 7/00
[52] U.S. Cl. ................................. 455/67.1; 455/33.1; 455/226.4
[58] Field of Search ..................... 455/33.1, 33.2, 33.3, 455/54.1, 54.2, 56.1, 62, 67.1, 67.3, 67.4, 67.6, 67.7, 226.1–226.4; 379/59, 60, 63

[56] References Cited

U.S. PATENT DOCUMENTS 4,475,010 10/1984 Huensch et al. ...................... 455/33
4,638,479 1/1987 Alexis ................................... 455/56
4,667,202 5/1987 Kammerlander et al. ............ 455/33
4,670,905 6/1987 Sandvos et al. ...................... 455/33
4,670,906 6/1987 Thro ..................................... 455/33
4,794,635 12/1988 Hess ..................................... 455/33

FOREIGN PATENT DOCUMENTS 9010341 9/1990 World Int. Prop. O. .
9010342 9/1990 World Int. Prop. O. .

Primary Examiner—Reinhard J. Eisenzopf
Assistant Examiner—Lisa Charouel
Attorney, Agent, or Firm—Oblon, Spivak, McClelland, Maier & Neustadt

[57] ABSTRACT

The present invention provides a method for checking the degree of coverage in a mobile radio system. According to the method, field strengths are utilized which have been measured from all base stations for all important traffic routes in the mobile radio system. The field strength values are related to geographical coordinates in a respective coverage area and the highest value for each coordinate is stored. The values noted are then compared with a predetermined coverage limit value. With the aid of the method, a graph can be produced using the field strength values stored for each coordinate, the coordinates which are lower or higher than the coverage limit value being marked in the graph.

1 Claim, 5 Drawing Sheets

ALVIK            0.    X:  160935   164555
                 0.    Y:  655992   659236

11-APR-89
COVERAGE DBM:
-130.0
C/I:
-99.0
INTERFERENCE % :
0.0

MEDIAN C:
-125.6
80-DEC C:
-105.3
MEDIAN I:
-120.9
80-DEC I:
-101.3

METHOD FOR DETERMINING THE DEGREE OF COVERAGE IN A MOBILE RADIO SYSTEM

This application is a continuation of application Ser. No. 07/591,466, filed on Nov. 1, 1990, now abandoned.

FIELD OF THE INVENTION

The present invention relates to a method for determining what coverage, seen overall, is obtained with a number of base stations in a mobile radio system or alternatively where there are "holes" in an intended total coverage. The invention is directly related to the problems set forth in Patent Applications 8900742-1, 8900743-9, 8900744-7 and 8900745-4 and especially to the invention "Method for radio cell planning" (8900744-7) the first corresponding to U.S. patent application Ser. No. 07/752,511 and the last three corresponding to U.S. patent application Ser. No. 07/752,510. The latter method utilizes field strength measurements and an allocating algorithm which permit a simple adaptation of the cell system, that is to say an increase or decrease in the number of cells, upon a change in traffic demand. For the method to operate in the intended way, an acceptable coverage of the traffic demand must be produced with the aid of a number of cells with suitable transmitter powers or antenna arrangements. The invention described here provides a method for checking, with the aid of information stored in a data base and obtained with field strength measurements around all large main roads in, for example, a metropolitan area, that the desired coverage is actually achieved.

PRIOR ART

The operator of a mobile radio system has hitherto not had detailed knowledge of the field strengths received at a mobile unit from base stations existing in the mobile radio system. If there have been "holes" in the coverage, this has been disclosed, for example, by way of complaints from customers or by having observed that the system has not been able to handle the desired traffic in certain situations. The present invention makes it possible to obtain accurate control of where coverage with a given coverage limit value is obtained, and to what extent extra cells must be planned in, or if it is sufficient to increase base station powers.

SUMMARY OF THE INVENTION

The invention provides a method for checking the degree of coverage, seen overall, over a number of cells in a mobile radio system including the steps of: measuring
field strengths from all base stations for all important traffic routes in the mobile radio system,
establishing a data base so that all field strength values are addressable for arbitrary space coordinates within the area in which the measurements are carried out,
classifying for each space coordinate the field strength values from all base stations and storing the highest field strength value, and values thus noted being compared with a predetermined coverage limit value.

Preferably, a graph is produced illustrating either where the highest field strength value exceeds a given coverage limit value along the traffic routes or where the highest field strength value along the traffic routes drops below a given coverage limit value, which latter case corresponds to so-called "holes" in the coverage.

DETAILED DESCRIPTION OF THE INVENTION

The ratio part in a mobile radio system consists of a number of base stations with individual coverages and existing mobile units. As is known, coverage at a given geographical point or in a given geographical area signifies that the field strength values exceed a specified limit value which ensures that the system operates properly and an acceptable signal/noise ratio is obtained. The degree of coverage is a qualitative measure of the portion of a geographical area which has coverage. When a mobile unit leaves the individual coverage of a base station to go over to communicate with an adjoining base station instead, it is important that the field strength does not at any time significantly drop below the coverage limit value. If this occurs and no adjoining base station can provide a sufficient field strength for coverage, a so-called "hole" occurs in the coverage which can result in a break-down in the communication between base and mobile unit which is irritating for the parties telephoning.

Figure 1:
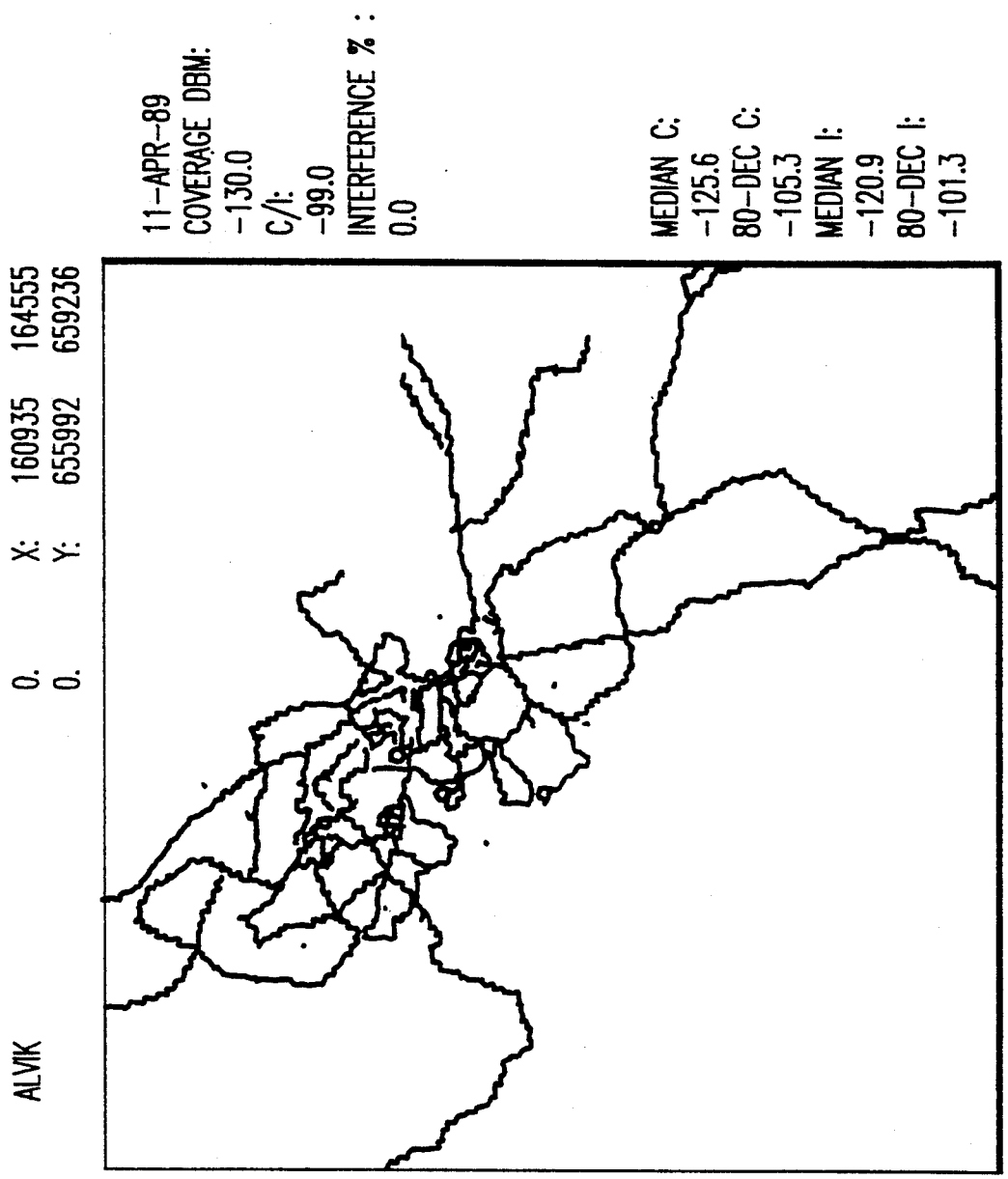
FIG. 1 shows a road network south of Stockholm which has been the object of measurements.

FIG. 1 shows an example of a road network around a base station, in this case Alvik in the Stockholm area. The points represent geographical coordinates where the field strength has been measured. Low field strengths (−130.0 dBm) have also been included so that the entire road network can be shown.

Figure 2:
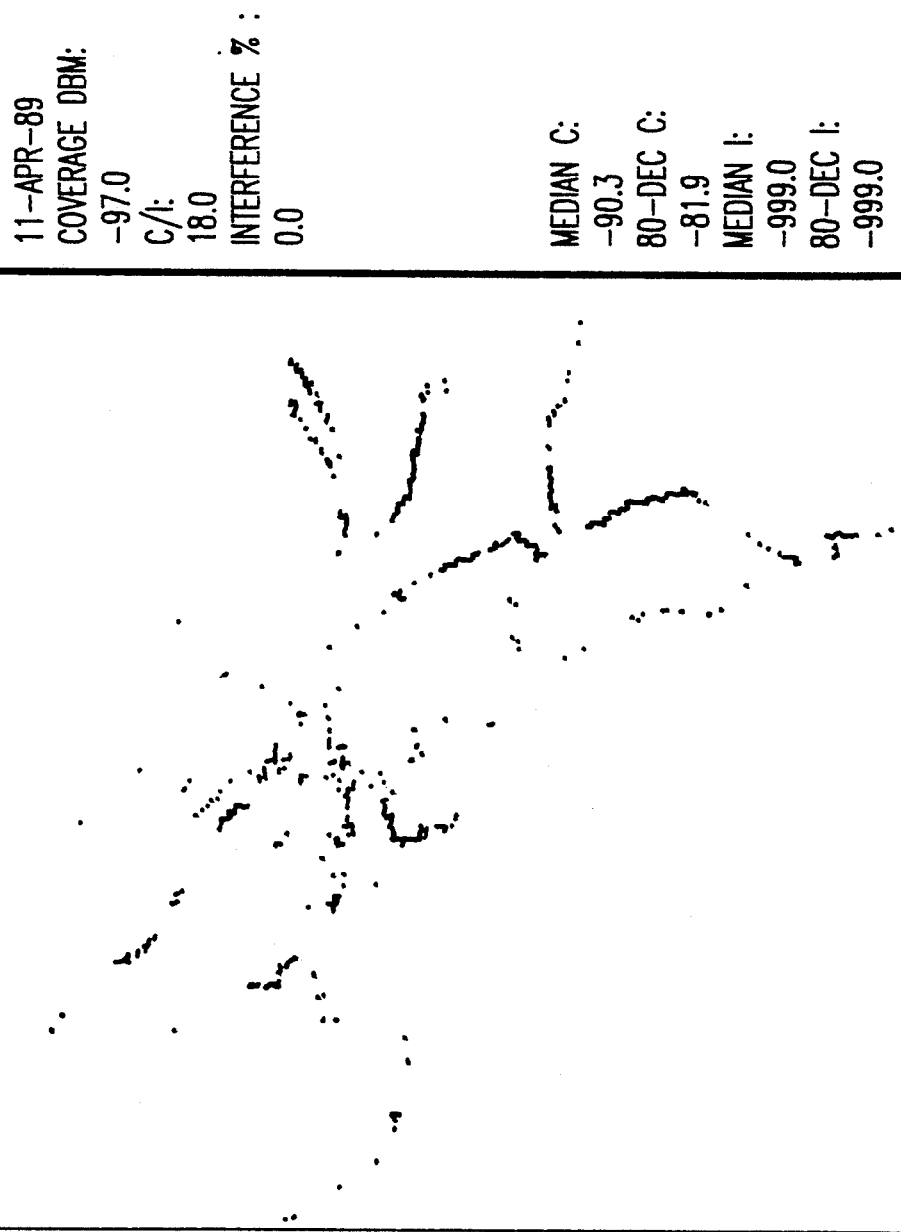
FIGS. 2-4 are examples of graphs of the absence of coverage defined at three different limit values of −97, −100 and −103 dBm.
Figure 3:
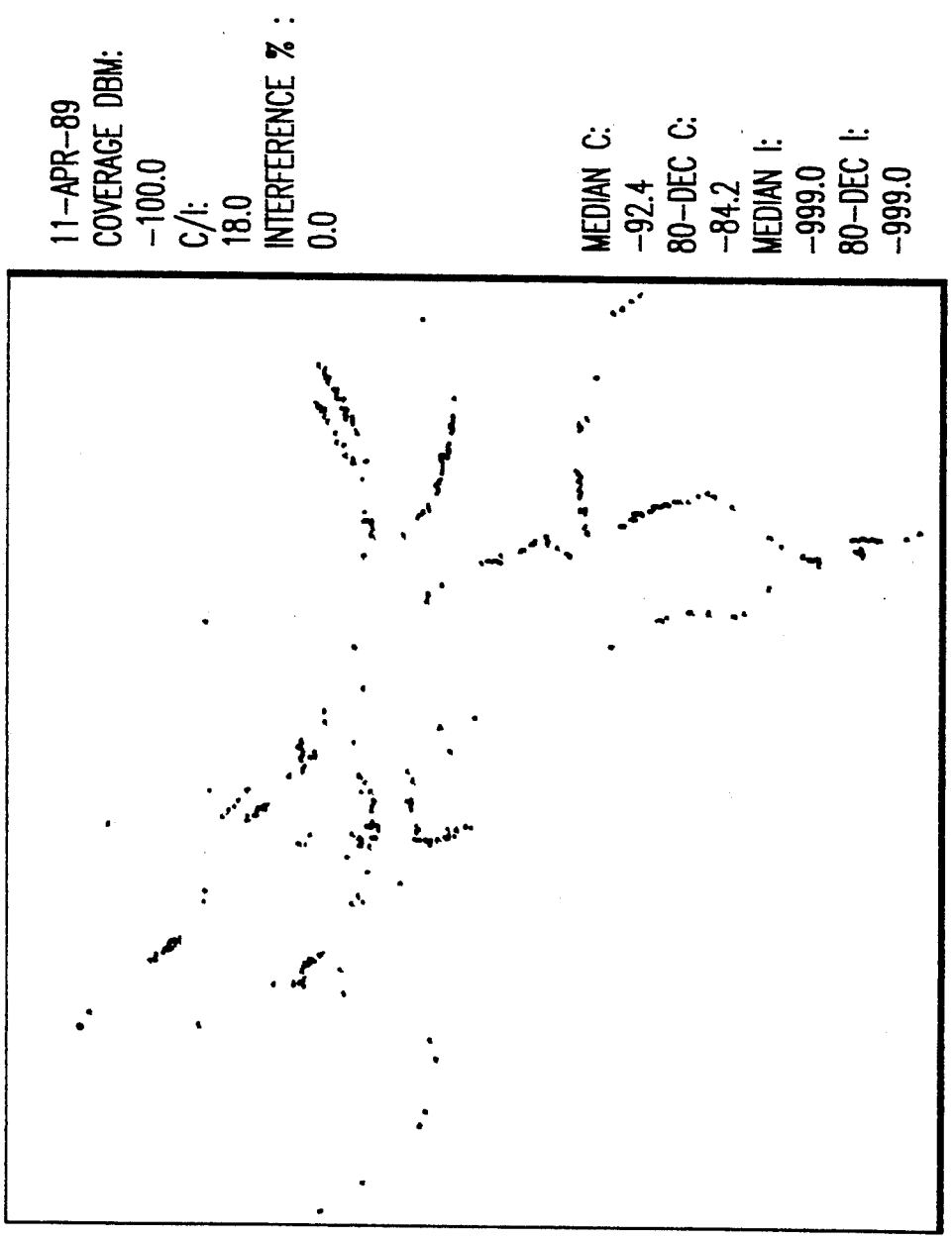
Figure 4:
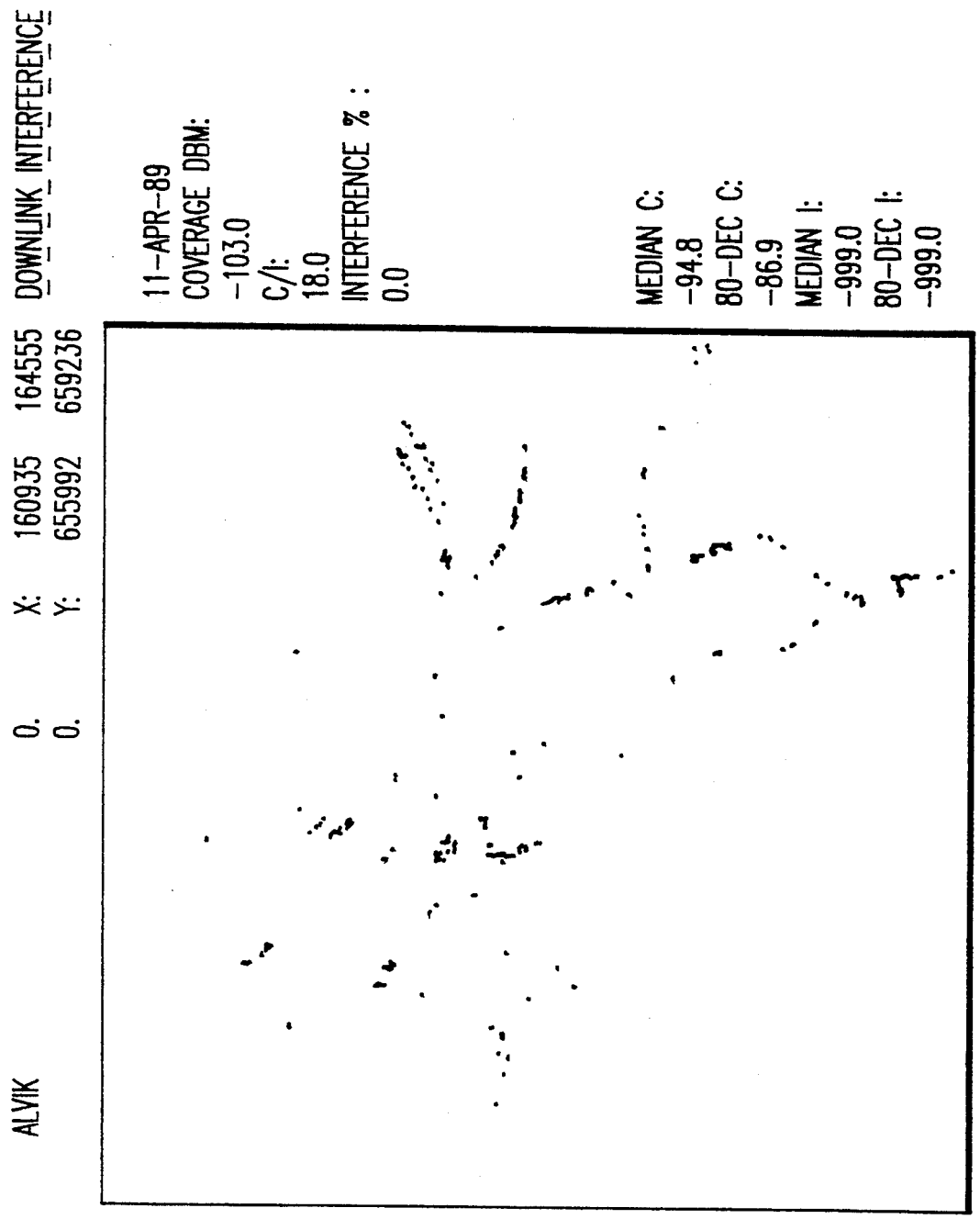

In FIGS. 2-4, the points represent geographical points where the field strength is lower than the limit value for coverage. An absence of coverage constitutes so-called "holes" with respect to the coverage limit values specified. FIGS. 2-4 are thus "negative" images of the coverage in the area. The coverage limit values are −97, −100 and −103 dBm for FIGS. 2, 3 and 4, respectively, thus successively lower limit values. It can also be seen that the lower the limit value set, the fewer holes there are.

The present invention thus provides an aid for controlling the degree of coverage in radio cell planning.

Figure 5:
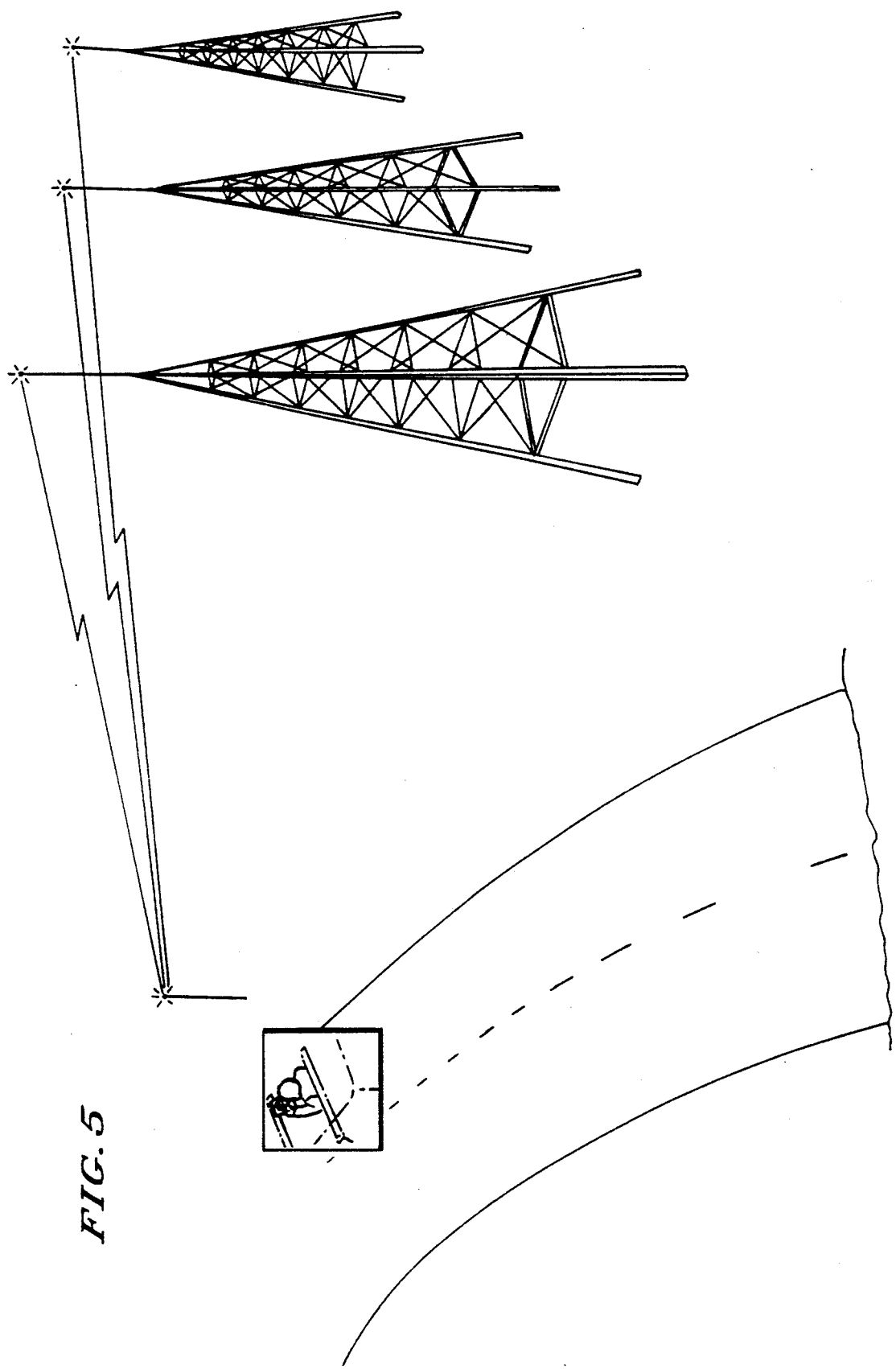
FIG. 5 is a graphic representation of the field strength measurement that occurs in this invention.

According to the invention, field strengths from all base stations are measured/calculated for all important traffic routes in the mobile radio system. The measurement of and calculation can occur via a field strength measuring device as noted in FIG. 5. A data base is set up so that all field strength values are addressable for arbitrary space coordinates whithin the area in which measurements are carried out. The field strength values from all base stations are classified for each space coordinate and the highest field strength value is stored and compared with the coverage limit value.

According to the invention, a graph can be produced by marking either where the highest field strength value exceeds a given coverage limit value along the traffic routes or where the highest field strength value along the traffic routes drops below the given coverage limit value, which latter case corresponds to so-called "holes" in the coverage.

We claim:

1. A method for checking the degree of coverage in a mobile radio system having a plurality of base stations which emit radio signals in associated individual coverage areas and a plurality of mobile stations, said method comprising the steps of:

producing a radio signal at each of said plurality of base stations;

measuring field strengths of the produced radio signals from each of said plurality of base stations along all important traffic routes located within the mobile radio system;

assigning a numerical value to the measured field strength values and relating said measured field strength values to geographical coordinates in the individual coverage areas;

comparing the field strength values from said plurality of base stations for each of said geographical coordinates and determining a highest value of said field strength values and storing said highest value for each of said geographical coordinates;

comparing the highest value stored for each of said geographic coordinates with a predetermined coverage limit value; and producing a first graphical display image of the field strength values for each of said geographical coordinates of those coordinates which have said stored highest value lower than said predetermined coverage limit value for determining holes in the coverage areas and producing a second graphical display of those coordinates having said stored highest value higher than the predetermined coverage limit value.

* * * * *